Oct. 23, 1928.
A. M. BROWN
1,688,683
SHOCK ABSORBER FOR AUTOMOBILE AND OTHER SPRINGS
Filed May 23, 1925
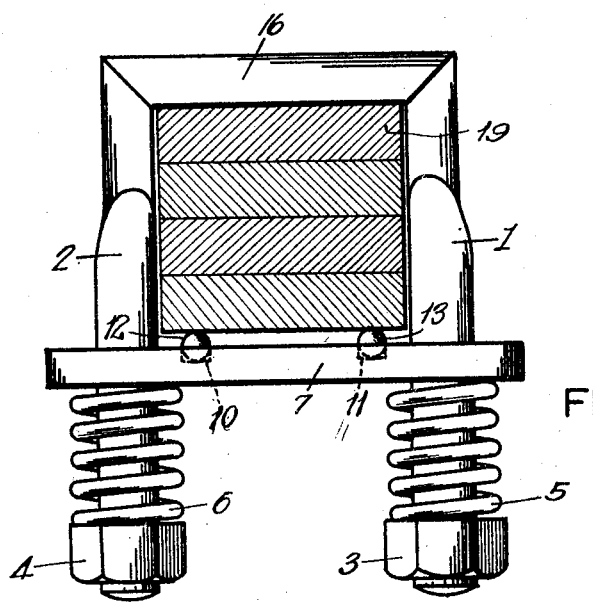
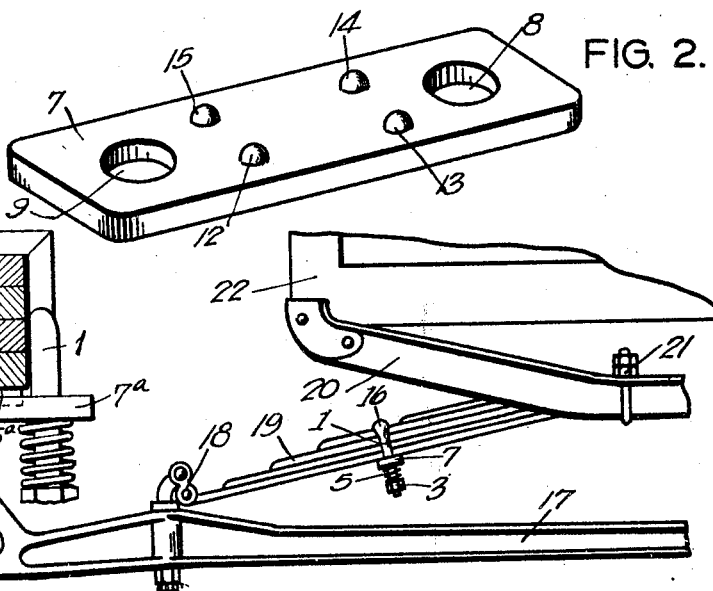
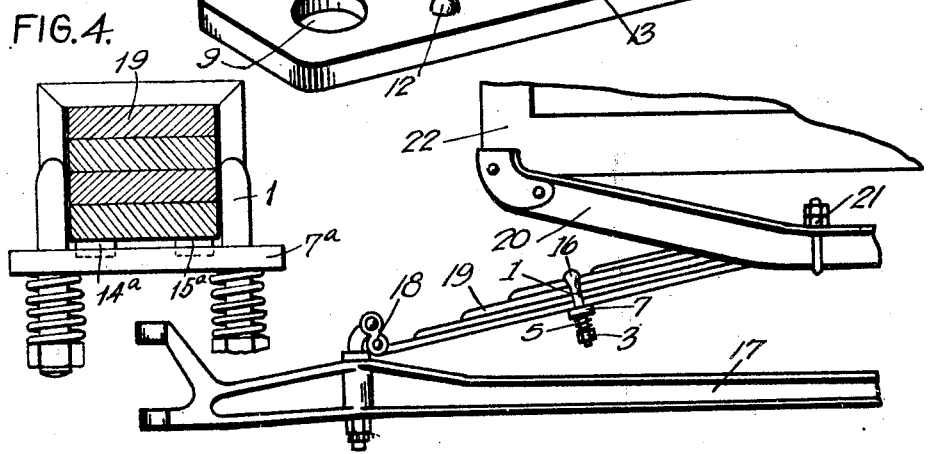
Arch M. Brown INVENTOR.
BY Loyal J. Miller
ATTORNEY.

Patented Oct. 23, 1928.

1,688,683

UNITED STATES PATENT OFFICE.

ARCH M. BROWN, OF CHICKASHA, OKLAHOMA.

SHOCK ABSORBER FOR AUTOMOBILE AND OTHER SPRINGS.

Application filed May 23, 1925. Serial No. 32,346.

The object of my invention is to provide a device of the character described, which will be easily and economically made and easily applied to any leaf spring; it allows all of the leaves of the springs to have full power but prevents the churning up and down movement of car or vehicle after the first shock on the springs, and prevents breaking of the springs and the separate leaves thereof, and makes for easier and better riding in cars equipped with the device.

The novel features, details of construction, combination of parts, and other objects of the invention will be hereinafter more particularly set forth, illustrated in the accompanying one-page drawing, and pointed out in the appended claims.

Reference is hereby, made to the drawing forming a part of this application, of which, Figure 1 is an elevation view of the device.

Figure 2 is a perspective view of the bearing plate with the anti-friction members in place;

Figure 3 is a perspective of the device applied to the leaf spring of an automobile; and Figure 4 a sectional elevation showing a modified form of the structure.

Like characters of reference designate like parts in all the figures.

The device consists of a shock absorber applicable to all leaf springs whether of the automobile type, or other and larger springs, particularly for locomotive, or heavy engines.

In this instance, see Figure 3, it is shown attached to a part of the ordinary Ford the following parts thereof being shown: axle 17, toggle-links 18, leaf springs 19, frame 20, connection of springs to frame 21 and body 22. None of these are a part of the device but simply show the application of it. The device may be said to comprise a clamping member or clip provided with two downwardly extending arms 1 and 2, the lower ends of which are threaded for the reception of nuts 3 and 4. Passing over the ends is a plate 7, the openings 8 and 9 therein for the reception of the ends 1 and 2 being sufficiently large to allow movement of the plate relatively to the clip without binding upon the arms. Interposed between the nuts 3 and 4 and the underface of the plate 7 are springs 5 and 6 which tend to force the plate 7 upwardly toward the lowermost leaf of the spring, which latter is denoted generally by 19. The upper surface of the plate 7 is provided with a plurality of cups or seats as 10 and 11 for the reception of bearing balls denoted by 12, 13, 14 and 15, respectively. These balls which are free to rotate in their seats bear against the smooth under-face of the lowermost leaf of the spring 19 so that the leaves may have relative sliding movement with reference to each other and to the clamp without undue friction. The use on rough roads and chuck-holes of the usual leaf springs for connecting the frame and body to the axle often results in an almost constant churning movement of the springs and body.

The re-action on the upper trend is practically as great as the first downward movement of the spring caused by the impact. The leaves of the spring being so strong and so free and there being nothing to lessen the movement of their various members they are allowed to keep moving up and down until the re-action has entirely spent its force.

The application of the device to a spring composed of a plurality of leaves by clamping the device either in the position shown in the drawings or the reverse thereof, will allow the spring 19 to ride on the balls 12, 13 and 14, which in turn rotate in their sockets or bearings formed in the plate 7. Thus, while the several leaves of the spring are clamped together any necessary movement of one leaf of the spring on another will be permitted and the first or heavy downward movement of the spring will not be interfered with, the secondary and upward movement thereof will be retarded and the shock quickly absorbed.

The same result may be obtained by the use of the roller bearings in lieu of ball bearing as above described and both are intended to be covered by this application. Such construction is shown in Figure 4 wherein the rollers are designated by 14$^a$ and 15$^a$, respectively.

Having thus described the invention, what is claimed and desired to be secured by Letters Patent, is:

1. In a device of the character described in combination with a leaf spring; a clip having its ends threaded, said clip being adapted to be passed over the spring; and bearing plate; anti-friction members inserted between said bearing plate and the adjacent face of the spring; springs surrounding the threaded ends of the clip; and nuts threaded on said ends, said nuts bearing against the springs and tending thereby to force the bearing plate inwardly and to hold the anti-friction members against the face of the leaf spring.

2. In a device of the character described in combination with a leaf spring; a U-shaped clip, the ends whereof are threaded, said clip being adapted to straddle the leaf spring; a bearing plate having openings formed therein through which the threaded ends of the clip freely pass, said plate likewise having seats formed therein for the reception of anti-friction elements; anti-friction elements mounted in the seats and bearing directly against the adjacent face of the leaf spring; springs surrounding the ends of the clip; and nuts threaded on the ends of said U-shaped clip and serving to force the springs upwardly or inwardly into contact with the bearing plate.

3. In a device of the character described in combination with a leaf spring; a clamping member having arms, said member being adapted to rest upon one face of the spring with the arms extending downwardly to each side thereof and beyond the spring; a bearing plate having openings through which said arms may freely pass, said plate being provided with bearings for the reception of anti-friction members, anti-friction members seated in said bearings and taking against the adjacent face of the leaf spring; and means for moving the clamping plate under yielding pressure toward the leaf spring.

ARCH M. BROWN.